(12) United States Patent
Lok et al.

(10) Patent No.: US 7,496,745 B1
(45) Date of Patent: Feb. 24, 2009

(54) METHOD AND SYSTEM FOR MANAGING STORAGE AREA NETWORKS

(75) Inventors: Ying P. Lok, Ladera Ranch, CA (US); David R. Eaves, Mission Viejo, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 602 days.

(21) Appl. No.: 11/346,106

(22) Filed: Feb. 2, 2006

Related U.S. Application Data

(60) Provisional application No. 60/650,017, filed on Feb. 4, 2005.

(51) Int. Cl.
*G06F 15/177* (2006.01)
(52) U.S. Cl. .................. 713/2; 713/1; 710/10; 709/222
(58) Field of Classification Search ............... 713/1, 713/2, 100; 710/10; 709/220, 221, 222
See application file for complete search history.

(56) References Cited

U.S. PATENT DOCUMENTS

| | | | |
|---|---|---|---|
| 6,954,881 B1 * | 10/2005 | Flynn, Jr. et al. | 714/43 |
| 2003/0149763 A1 * | 8/2003 | Heitman et al. | 709/224 |
| 2004/0225764 A1 * | 11/2004 | Pooni et al. | 710/38 |
| 2005/0080982 A1 * | 4/2005 | Vasilevsky et al. | 711/1 |
| 2005/0138466 A1 * | 6/2005 | Spry | 714/6 |

* cited by examiner

*Primary Examiner*—Dennis M Butler
(74) *Attorney, Agent, or Firm*—Klein, O'Neill & Singh, LLP

(57) ABSTRACT

A method and system for managing storage devices is provided. The method includes determining during a boot process if a logical unit number ("LUN") key exists; and proceeding to a phase 1 of the boot process if the LUN key does not exist or proceeding to a phase 2 of the boot process if the LUN key does exist.

26 Claims, 13 Drawing Sheets

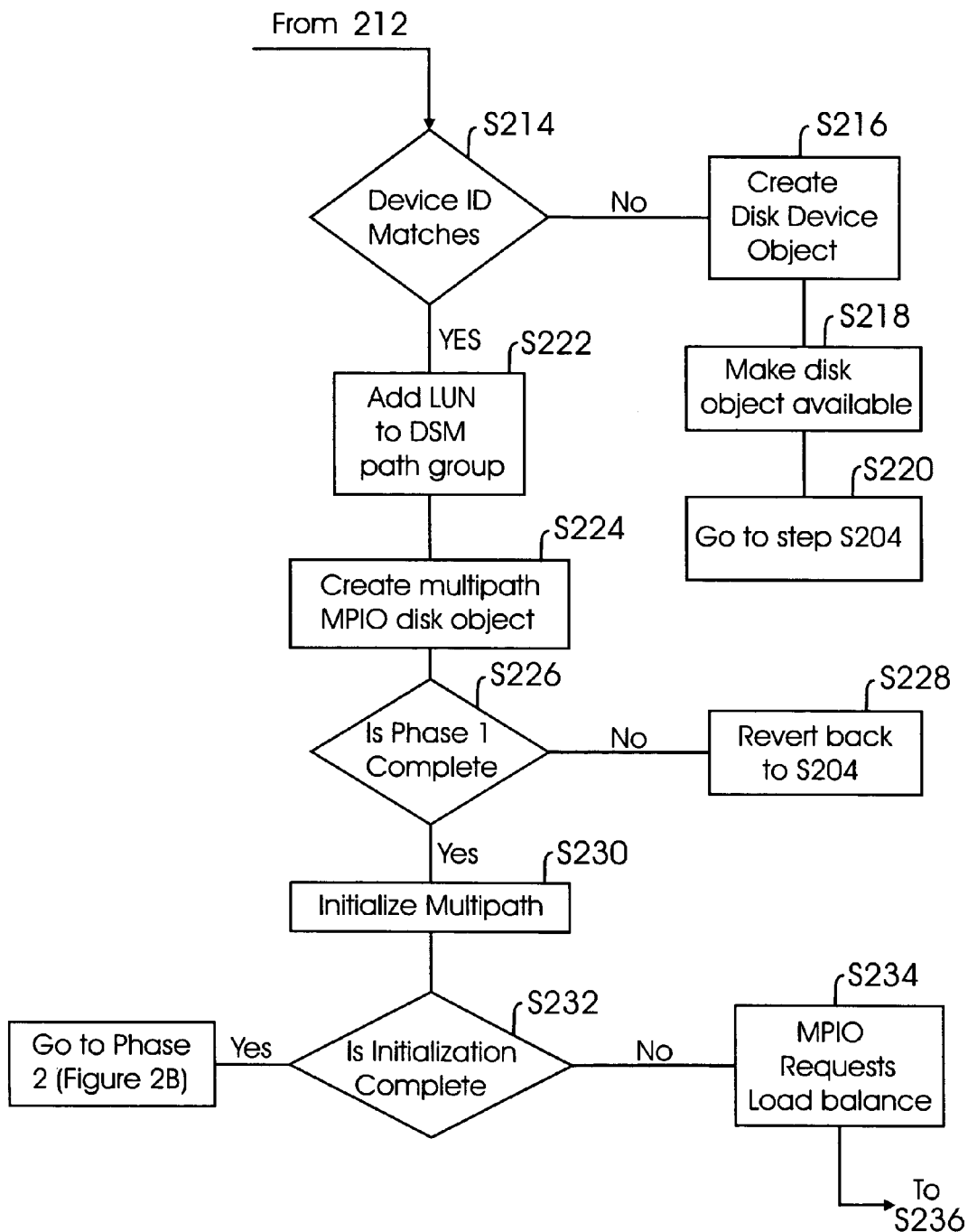
FIGURE 2A(ii)

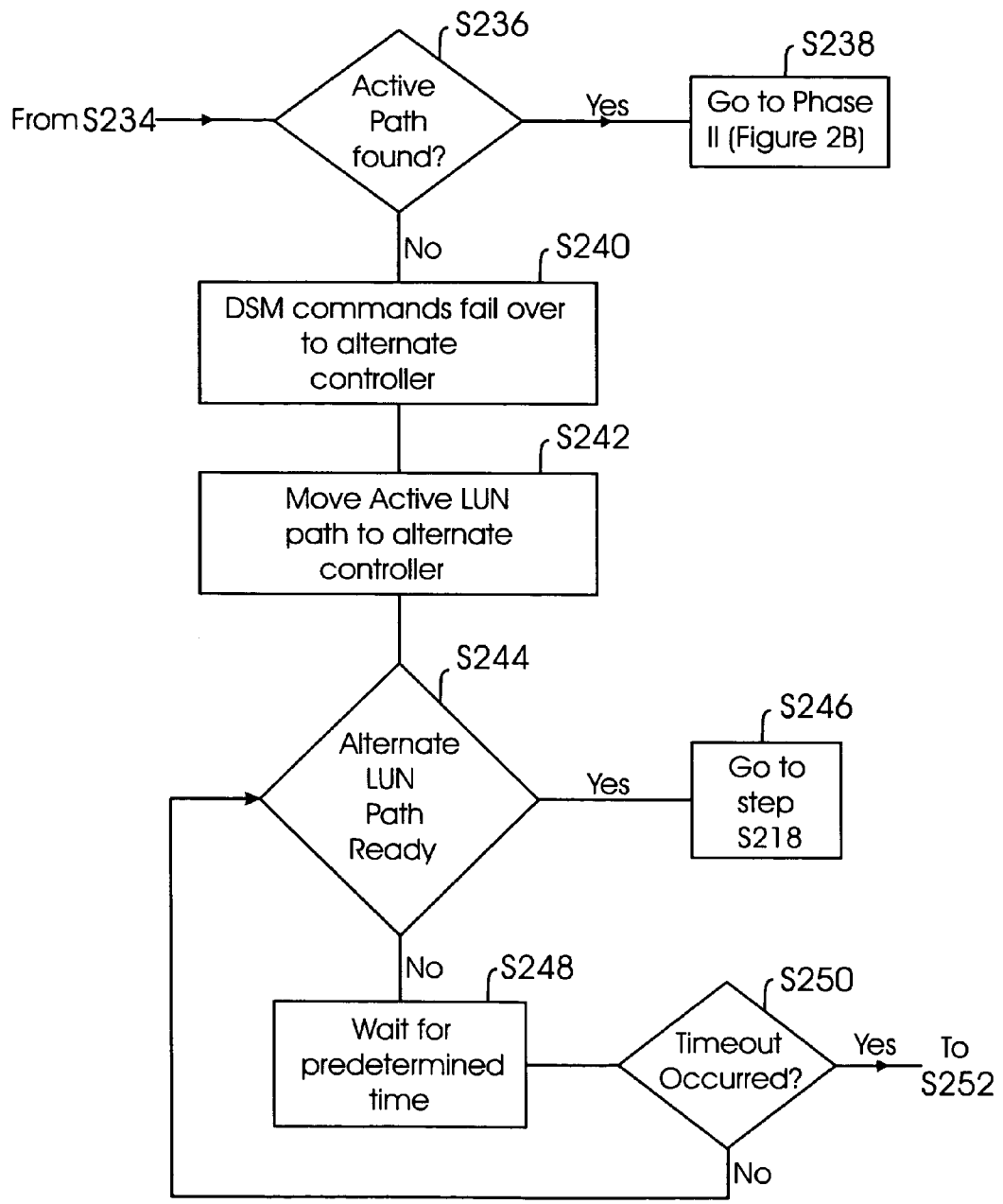
FIGURE 2A(iii)

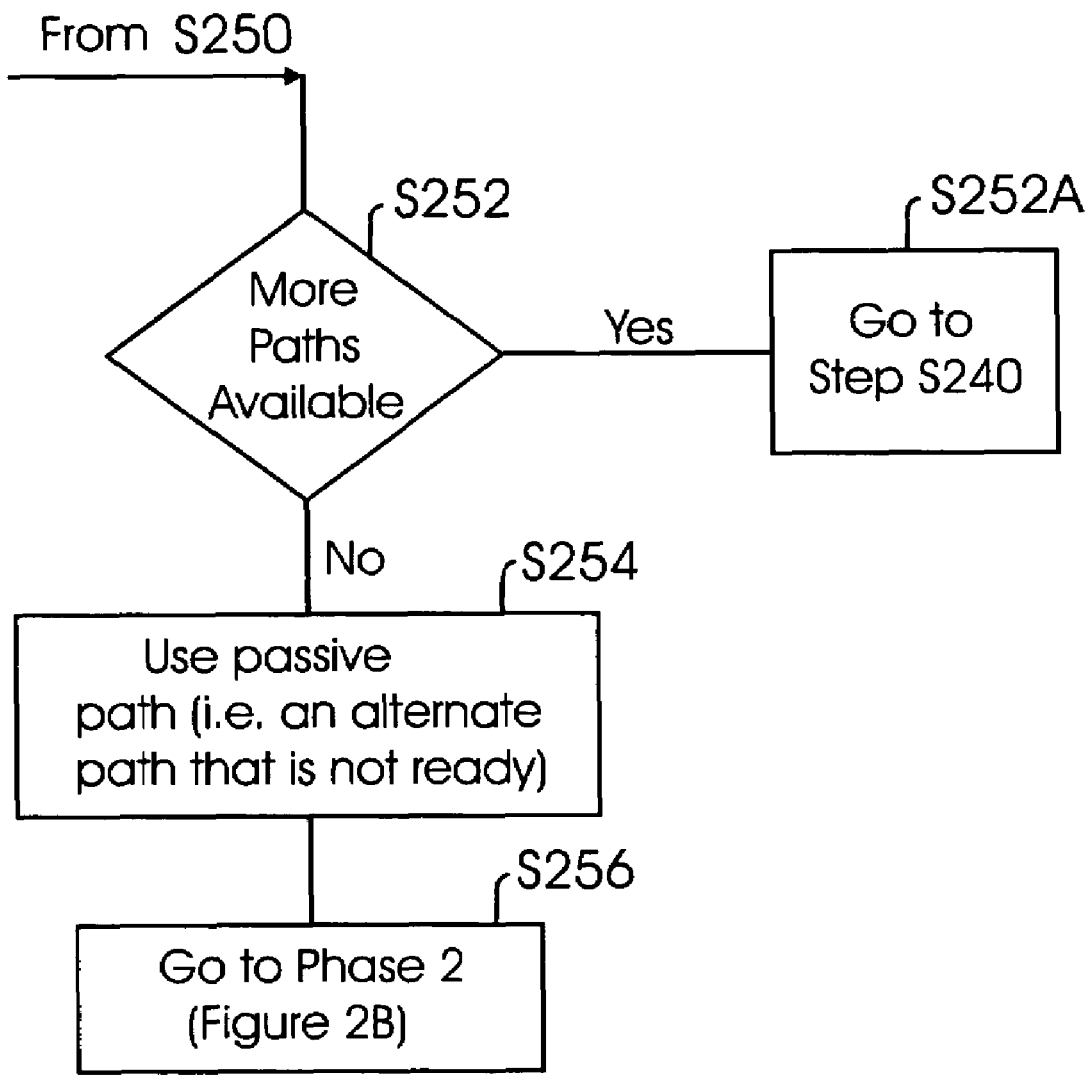
FIGURE 2A(iv)

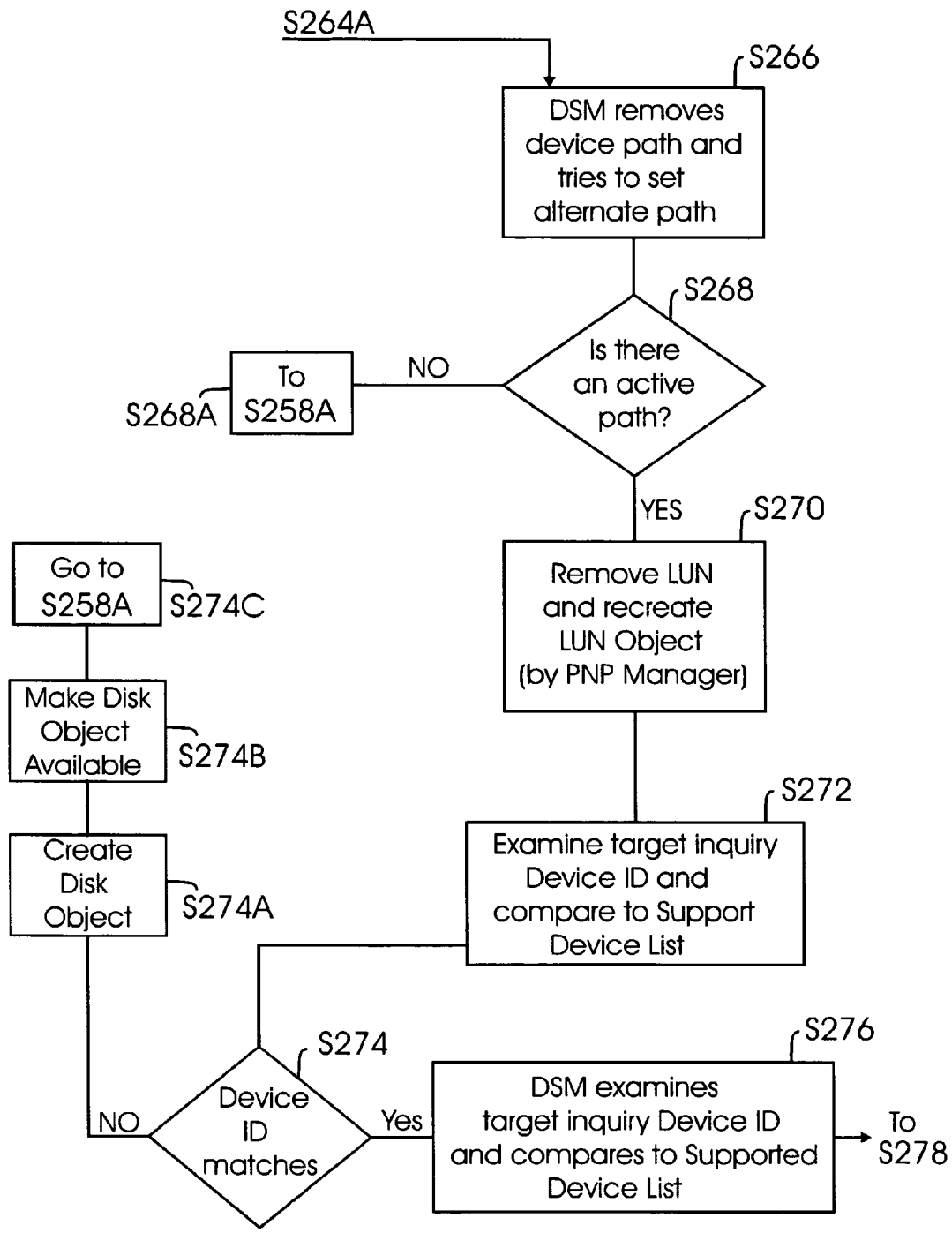
FIGURE 2B (ii)

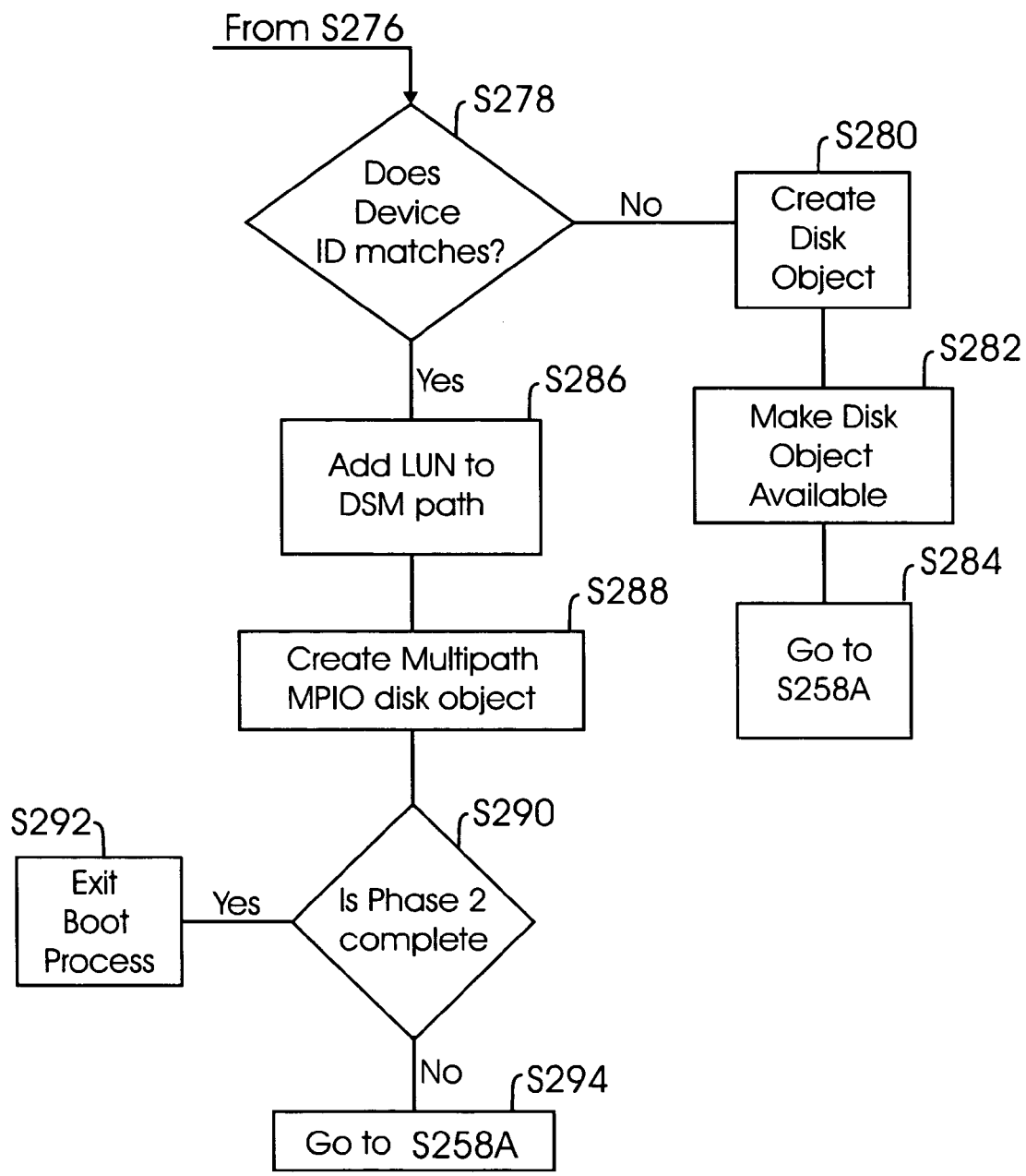
FIGURE 2B(iii)

METHOD AND SYSTEM FOR MANAGING STORAGE AREA NETWORKS

CROSS-REFERENCE TO RELATED APPLICATIONS

This application claims the benefit, under 35 U.S.C. § 119(e), of U.S. Provisional Patent Application No. 60/650,017 filed on Feb. 4, 2005, the disclosure of which is incorporated herein in its entirety.

BACKGROUND

1. Field of the Invention

The present invention relates to storage systems, and more particularly, to managing storage area networks.

2. Background of the Invention

Storage area networks ("SAN") are commonly used to store and access data. SAN is a high-speed sub-network of shared storage devices, for example, disks and tape drives. A computer system (may also be referred to as a "host") can access data stored in the SAN.

Host systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits.

Typical SAN architecture makes storage devices available to all servers that are connected using a computer network, for example, a local area network or a wide area network. The term server in this context means any computing system or device coupled to a network that manages network resources. For example, a file server is a computer and storage device dedicated to storing files. Any user on the network can store files on the server. A print server is a computer that manages one or more printers, and a network server is a computer that manages network traffic. A database server is a computing system that processes database queries.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety.

PCI-Express is another Input/Output ("I/O") bus standard (incorporated herein by reference in its entirety) that is compatible with existing PCI cards using the PCI bus. PCI-Express uses discrete logical layers to process inbound and outbound information.

Various other standard interfaces are also used to move data between host systems and storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others.

The iSCSI standard (incorporated herein by reference in its entirety) is another standard used in SANs. iSCSI is based on Small Computer Systems Interface ("SCSI"), which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

The iSCSI architecture is based on a client/server model. Typically, the client is a host system such as a file server that issues a read or write command. The server may be a disk array that responds to the client request. Devices that request I/O processes are called initiators. Targets are devices that perform operations requested by initiators. Each target can accommodate up to a certain number of devices (for example, 8), known as logical units, and each is assigned a Logical Unit Number (LUN).

The term LUN as used throughout this specification means a logical unit number on a Parallel SCSI or Fiber Channel or iSCSI target. LUN is typically a unique identifier used on a SCSI bus to distinguish between devices that share the same bus. SCSI is a parallel interface that allows up to 16 devices to be connected along a single cable. The cable and the host adapter form the SCSI bus, and this operates independently of the rest of the computer. Each device is given a unique address by the SCSI basic input and output system ("BIOS"). Commands that are sent to a SCSI controller identify devices based on their LUNs.

To ensure that data in a SAN is available at all times, a multi-path input output ("MPIO") architecture is now being proposed. This architecture is intended to provide storage vendors (for example, HBA vendors) more than one path to read/write to/from a storage device.

The MPIO architecture allows HBA vendors to develop a device specific module ("DSM") to operate with the modules/drivers of the MPIO architecture. This is intended to provide fault tolerance against a single point of failure in hardware components as well as mechanism for load balancing. Typically, an application running on a host server or a computing system that is connected to a server is used to manage various SAN components.

Microsoft Corporation® has proposed a MPIO architecture that includes a MPIO driver. The MPIO driver uses a logical disk device object to represent an actual physical disk device object that interfaces with the physical LUN. If the Windows Plug and Play manager removes the disk drive object (for example, due to a cable unplug), the operation is detected and a new path to the disk drive is selected.

The current MPIO architecture has shortcomings. For example, when a server is being booted and a LUN is being created, the Windows Plug and Play Manager first creates a physical device object for a LUN and during the tail end of the boot process, when a Windows Administrator is logging, the same physical object is removed and then re-created.

Both MPIO and DSM depend on the Windows Plug and Play manager for notification of creation and removal of LUN device objects. Hence, when the LUN is created, MPIO notifies DSM that an object is created. The DSM then creates a path to the object. When the object is removed, DSM performs a failover and the path is removed.

The create/remove/create operations result in unnecessary failover and "fail back" operations for newly created LUNs. This results in inefficiencies and delay.

Therefore, there is a need for a method and system that efficiently performs the boot process.

SUMMARY OF THE PRESENT INVENTION

In one aspect of the present invention, a method for managing storage devices is provided. The method includes determining during a boot process if a logical unit number ("LUN") key exists; and proceeding to a phase 1 of the boot process if the LUN key does not exist or proceeding to a phase 2 of the boot process if the LUN key does not exist.

In another aspect of the present invention, a networking system is provided. The system includes a computing system with a processor for executing computer executable code; and a host bus adapter coupled to the computing system to interface with at least a storage device; wherein the processor executes code to determine during a boot process if a logical unit number ("LUN") key exists; and proceeds to a phase 1 of the boot process if the LUN key does not exist or proceeds to a phase 2 of the boot process if the LUN key does exist.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a system using storage devices will be described. The specific architecture and operation of the preferred embodiment will then be described with reference to the general architecture.

Figure 1A:
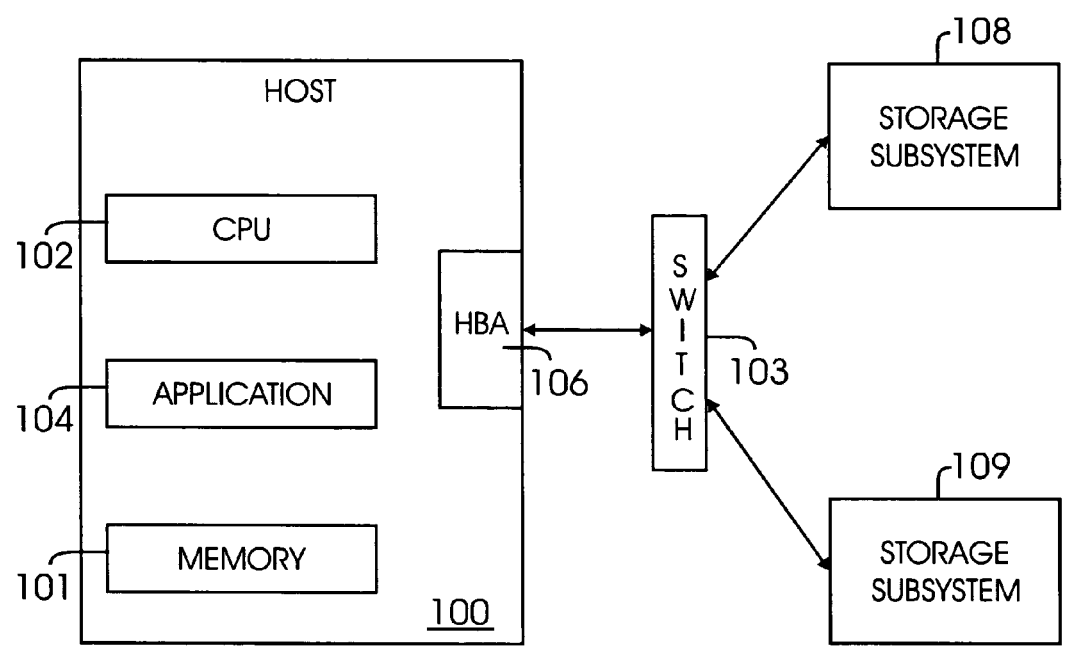
FIGS. 1A shows a block diagram of a host computing system used according to one aspect of the present invention.

FIG. 1A shows a block diagram of a host computing system 100. System 100 includes a central processing unit 102 that executes program instructions out of memory 101 that may be random access memory (RAM). Read only memory (not shown) is also provided to store invariant instruction sequences such as start-up instruction sequences or basic input/output operating system (BIOS).

HBA 106 is used to interface host 100 with storage sub-systems 108 and 109 via switch 103. It is noteworthy that various other configurations/architecture may be used for HBA 106 to interface with storage sub-systems 108 and 109, for example, using a fabric switch or loop architecture.

Application 104 may be a stand-alone application software module that is available to manage the storage sub-systems. Output from application 104 is available to an administrator (for example, a Windows Administrator in the "Windows" environment) for monitoring the storage sub-systems.

Figure 1B:
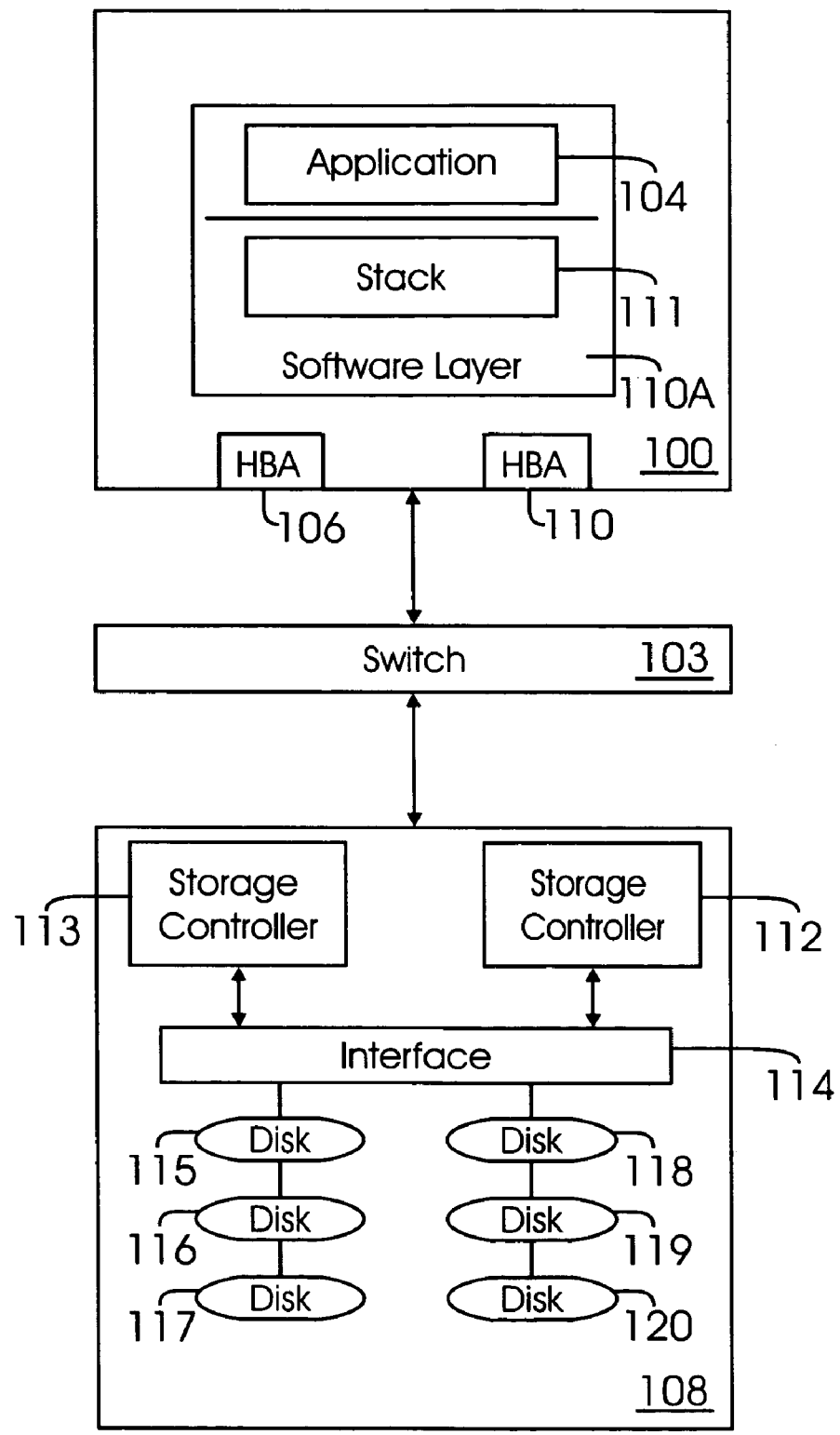
FIG. 1B shows an example of a software layer used by a host system that interfaces with a storage system, used according to one aspect of the present invention.

FIG. 1B shows another block diagram of a system, used according to one aspect of the present invention. Host 100 includes a software layer 110A (that includes the operating system, not shown) with a software stack 111 and application 104.

Host 100 in this configuration includes HBAs 106 and 110 to communicate with storage subsystem 108. Storage sub-system 108 includes storage controllers 112 and 113 that allow data to be read and written to/from disks 115-120. Interface 114 is used to exchange read/write commands between disks 115-120 and storage controllers 112 and 113.

Figure 1C:
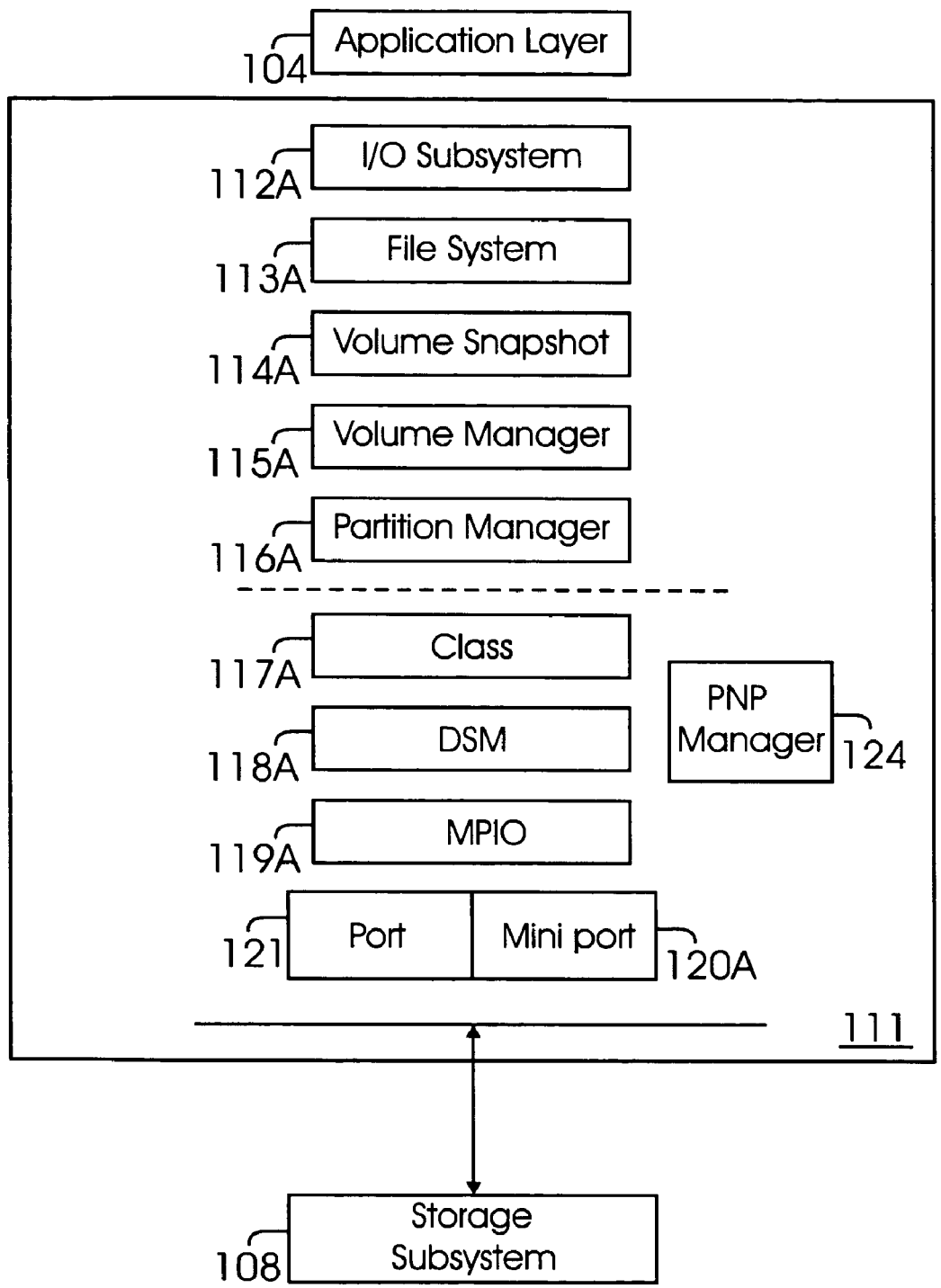
FIG. 1C shows an example of a software stack used according to one aspect of the present invention.

FIG. 1C shows a block diagram of a software stack 111. Stack 111 includes an I/O sub-system layer 112A that includes I/O request to a file system layer 113A. Volume snapshot layer 114A manages software snapshots, while Volume Manager layer 115A presents volumes to users and supports basic and dynamic disks (RAID).

Partition manager layer 116A manages disk partitions, while class layer 117A manages specific device types, for example, disks and tapes.

DSM layer (may also be referred to as "DSM") 118A is provided by storage vendors to interface with MPIO layer 119A. DSM 118A is contacted by MPIO layer 119A to determine if a particular device is supported or not. When an application (104) makes an I/O request, then DSM 118A determines the path through which the request should be sent. If the path is broken, DSM 118A can re-route the request.

Port 121 manages a specific transport protocol, for example, SCSIport for SCSI, and Storport for RAID and fibre channel. Miniport 120A is supplied by a particular vendor and links to a specific driver for managing specific hardware details.

Figure 1D:
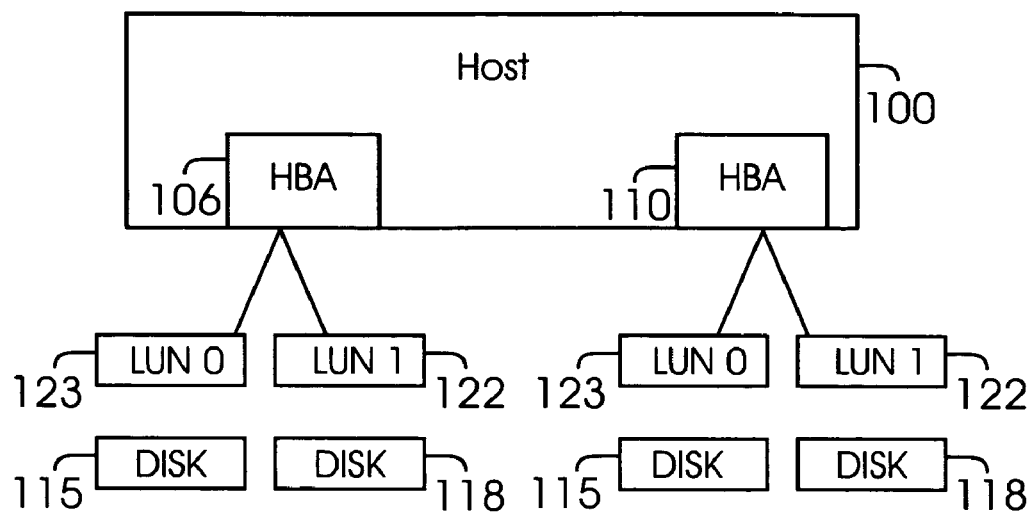
FIG. 1D shows a block diagram of a system without a MPIO layer.

FIG. 1D shows an example of a system without using the MPIO layer 119A. In FIG. 1D, HBA 106 is coupled to LUN 0 123 and LUN 1 122. HBA 110 is also coupled to LUN 122 and 123. In this configuration, a host may incorrectly interpret the two paths leading to the storage devices.

Figure 1E:
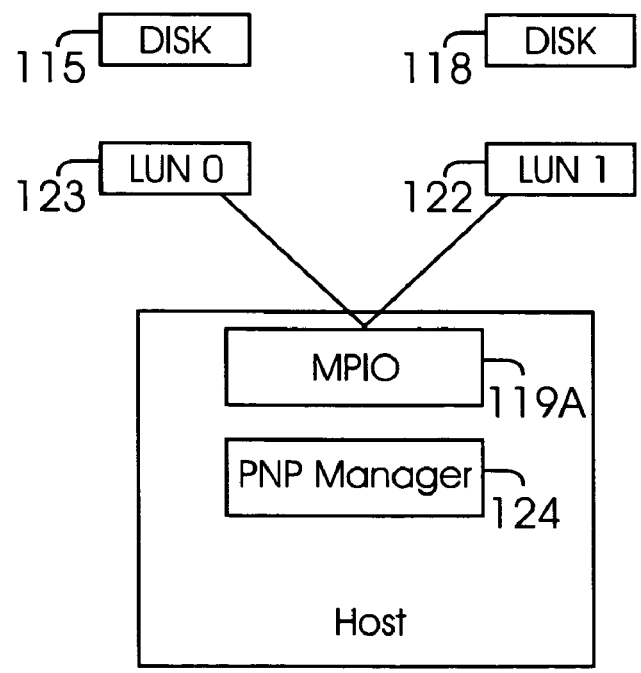
FIG. 1E shows a block diagram of a system with a MPIO layer, used according to one aspect of the present invention.

FIG. 1E shows a configuration with MPIO layer 119A. Windows Plug and Play manager ("PNP Manager") 124 interfaces with MPIO layer 119A and other layers as well. MPIO 119A is coupled to LUN 122 and 123. Using MPIO layer 119A, a host system correctly interprets the paths leading to the same storage unit.

To identify a device, first it is identified as belonging to a specific vendor and then a determination is made as to whether the DeviceID (device identifier) represents a unique device or if the same device is being coupled through another path.

Figure 1F:
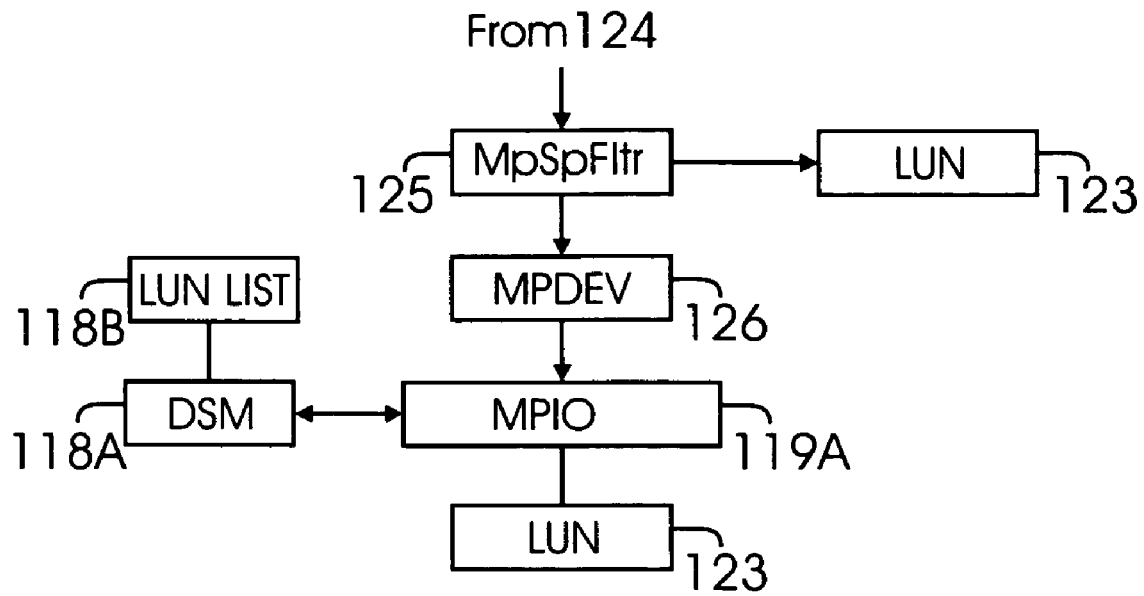
FIG. 1F shows a block diagram of a system that can recognize/add a device using the MPIO layer; according to one aspect of the present invention.

FIG. 1F shows a block diagram of how a device is recognized (or added) using MPIO layer 119A. MPIO Layer 119A includes three multi-path drivers, a port filter driver, disk driver replacement and a bus Driver. The port filter driver is referenced as "MpSpFltr (shown as 125) and loads between a port driver 121A and class driver 117A.

Multi-path disk driver replacement is referenced as "MPDEV" (shown as 126). Once a device is identified and associated with a DSM 118A, then this driver claims ownership of a device object.

MPIO layer bus driver (not shown, MPIO.SYS) manages connection between a device and host. MPIO.SYS also manages the connection between MPIO layer 119A and PNP manager 124.

PNP manager 124 sends device information to MpSpFltr 125 that sends it to MPDEV layer 126. The information is then passed to MPIO layer 119A. MPIO layer 119A then interfaces with DSM 118A to ensure that DSM 118A supports that device.

Figure 1G:
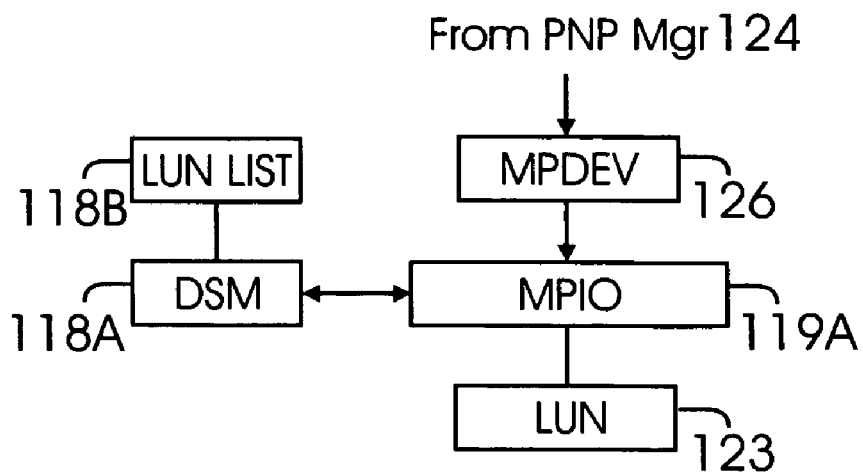
FIG. 1G shows a block diagram of a system that can remove a device using the MPIO layer; according to one aspect of the present invention.

FIG. 1G shows a block diagram for removing a device. PNP Mgr 124 sends a device removal request/command to MPDEV 126, who then notifies MPIO 119A. MPIO 119A advises DSM 118A that a device is being removed and the device is then removed.

In one aspect of the present invention, a system and method is provided, where DSM layer 118A keeps track of all LUNs that are being used. DSM layer 118A maintains a LUN list 118B (FIG. 1F) for all adapters (for example, 106)/storage controllers (for example, 113) that it supports. The LUN list 118B is saved in a windows registry located at memory 101. Any LUN that is not in the list, when the system is booting, is treated as a new LUN. When this is detected, DSM layer 118A ignores the first redundant LUN path notification from MPIO layer 119A that originates via PNP manager 124.

Figure 2A:
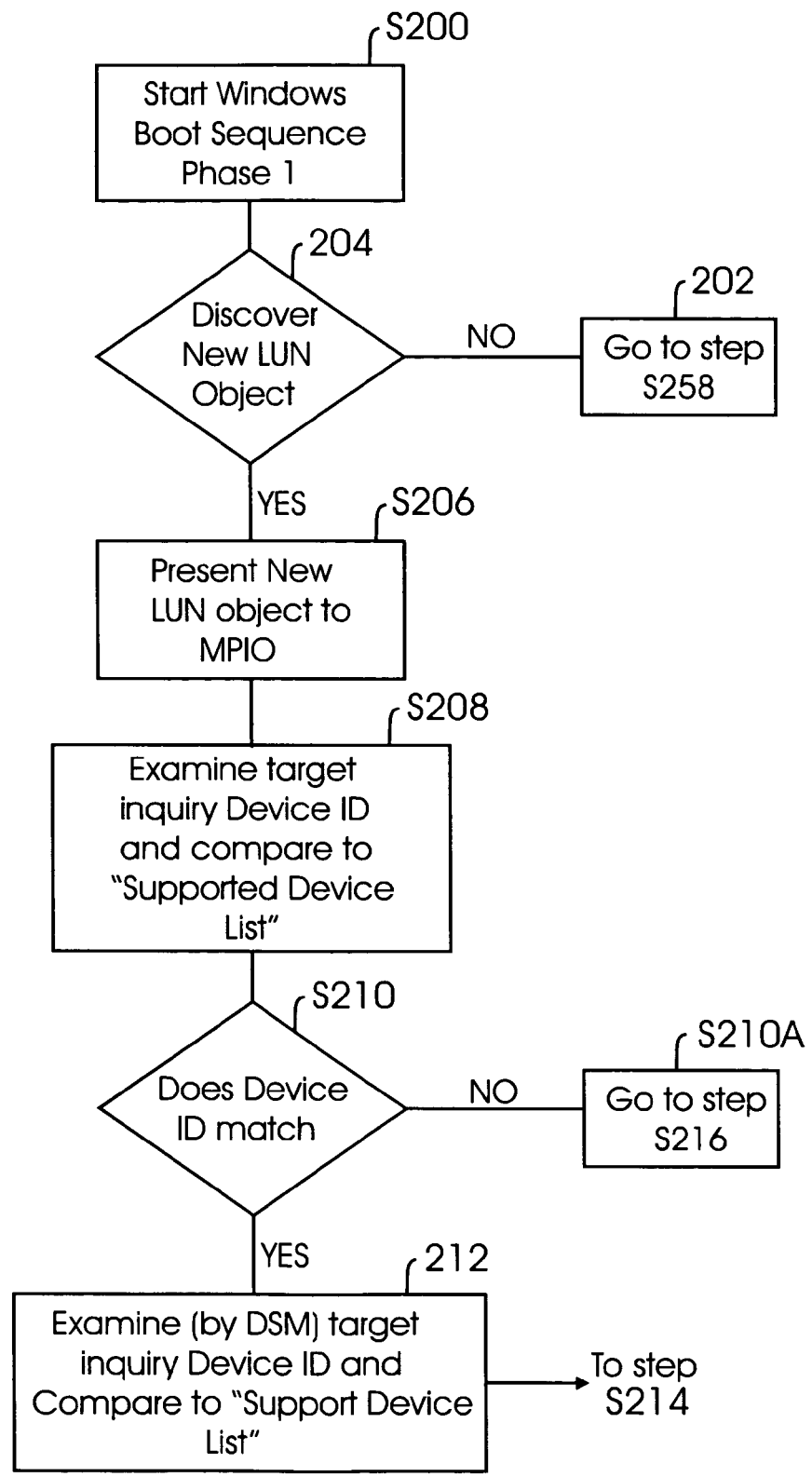
FIGS. 2A(i)-(iv) and B(i)-(iii) show process flow diagrams for phase 1 and phase 2 of the windows boot process.
Figure 2B:
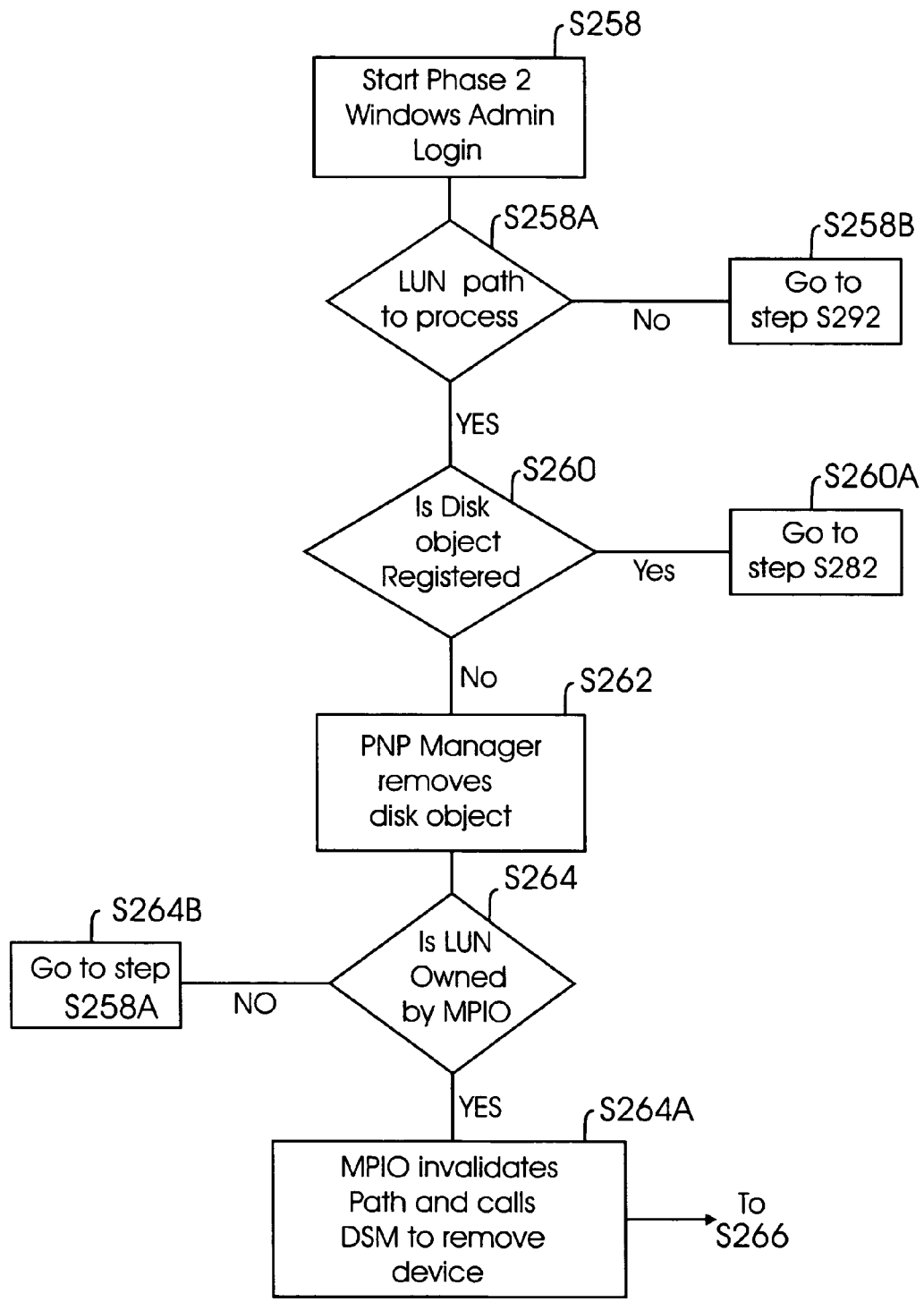
Figure 3:
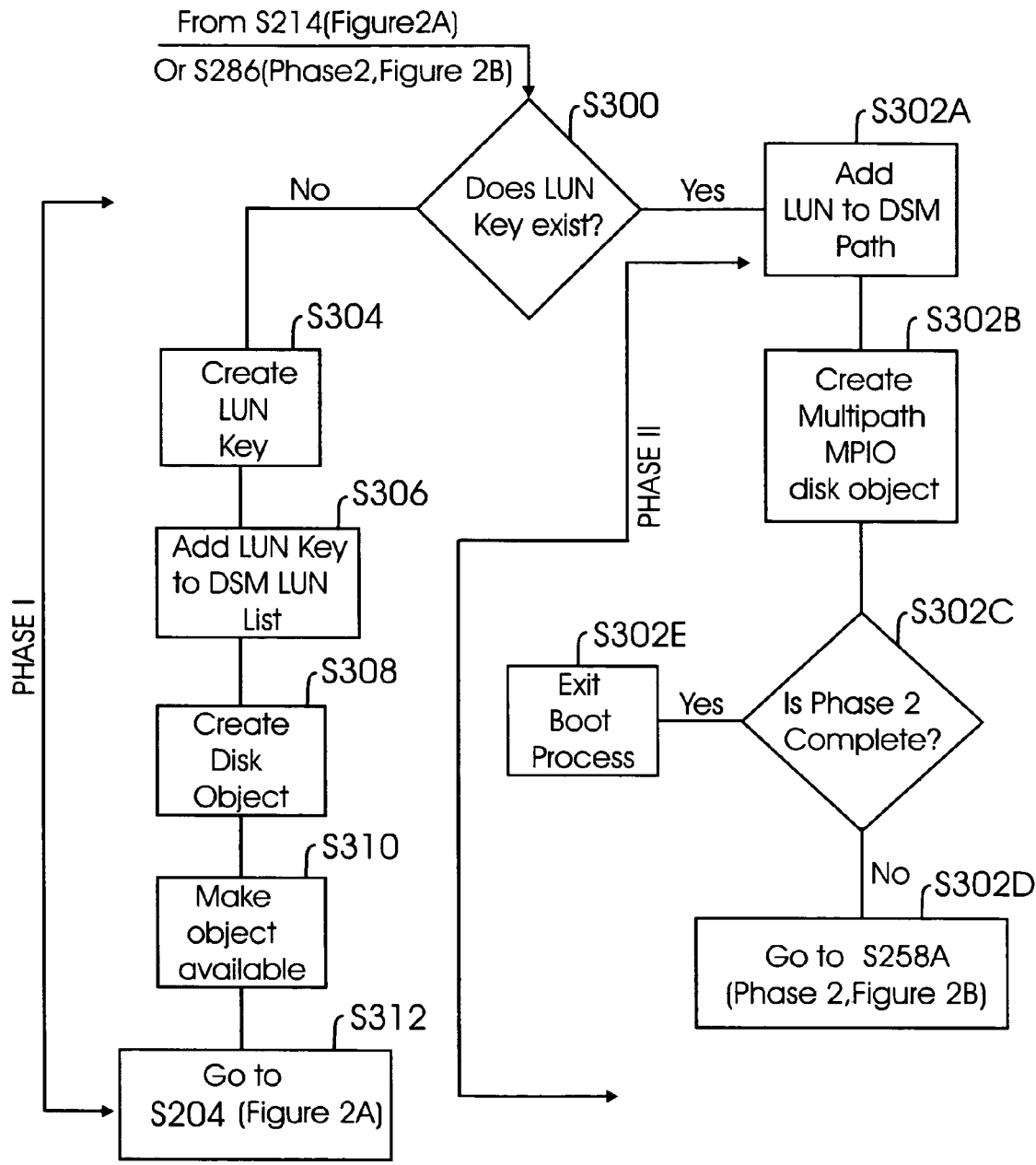
FIG. 3 shows a flow diagram for a streamlined boot process, shows a block diagram of a system that can recognize/add a device using the MPIO layer; according to one aspect of the present invention.

Before describing the adaptive solution in FIG. 3, according to the present invention, the following describes (with respect to FIGS. 2A and 2B) the create/remove problem with the present MPIO architecture.

FIGS. 2A and 2B describe the windows booting process for host 100 in two phases, 1 and 2. Phase 2 begins at the tail end of Phase 1 when a Windows Administrator using application 104 starts logging.

Turning in detail to FIG. 2A((i)-(iv)), in step S200, the boot sequence (Phase 1) is started. In step S204, PNP Manager 124 determines if a new LUN object has been discovered. If no new LUN object is discovered, then in step S202, the process moves to step S258 (FIG. 2B).

If a new LUN object is discovered by PNP Manager 124, the new object is presented to MPIO layer 119A in step S206. In step S208, MPIO 119A examines the device identifier ("DeviceID") received from the HBA 106 and/or storage controller 112). The DeviceID is compared to a list that includes all the DeviceIds of the supported devices.

If there is no match in step S210, the process moves to step S216 (in step S210A).

If there is a match in step S210, then the DeviceID is examined by DSM layer 118A in Step S212. If the DeviceID matches in step S214, then in step S222, the LUN is added to a DSM path group.

In step S224, a multi path device object is created and the process determines if phase 1 is complete in step S226. If phase 1 is not complete, then in step S228, the process reverts back to step S204.

If path 1 is complete, then the multi path is initialized in step S230. In step S232, the process determines if the initialization is complete. If yes, then the process moves to Phase 2 (FIG. 2B).

If initialization is not complete, then in step S234, MPIO layer 119A requests load balancing and in step S236, the process determines if an active path (that allows access to a LUN) is found. If yes, then, the process goes to Phase 2 in step S238.

If an active path is not found then in step S240, DSM layer 118A commands a fail over to an alternate controller (for example, from 113 to 112, vice-versa).

In step S242, the active path is moved to the alternate controller by DSM layer 118A. In step S244, the process determines if the alternate path is ready. If yes, then in step S246, the process goes to step S218. If not, then the process waits for a programmable predetermined period of time, in step S248. If a timeout does not occur, the process simply waits.

If a timeout occurs in step S250, the process determines if more active paths are available. If more paths are available, then in step S252A, the process moves to step 240.

If more paths are not available, then, in step S254, passive paths are used and in step S256, the process moves to Phase 2.

If the DeviceID does not match in step S214, then in step S216 a disk device object is created. This object is not for a multi-path. In step S218, the object is available for application 104 and the process moves back to step S204.

FIG. 2B shows the process flow diagram for Phase 2 of the boot process that begins in step S258. This step begins at the tail end of Phase I and hence there is some overlap.

In step S258A, the process determines if there is a LUN path to process. If not, then in step S258B, the process moves to step S292.

If a LUN path is available, then in step S260, the process determines if a disk object is registered. If yes, then in step S260A, the process moves to step S282.

If disk object is not registered, then in step S262, PNP manager 124 removes the disk object.

In step S264, the process determines if the LUN is owned by MPIO 119A. If not, then in step S264B, the process reverts back to step S258A.

If the LUN is owned by MPIO 119A, then in step S264A, MPIO 119A invalidates the path and calls DSM layer 118A to remove the object.

In step S266, DSM layer 118A removes the object and tries to set an alternate path.

In step S268, DSM 118A determines if there is an active path. If not, then in step S268A, the process reverts back to step S258A.

If there is an active path, then in step S270, the LUN object is removed and then re-created by PNP manager 124.

In step S272, MPIO layer 119A examines the DeviceId and compares to a Supported device list. If the device ID does not match in step S274, then in step S274A a disk object is created. The disk object is then made available in step S274B and in step S274C the process reverts back to step S258A.

If there is a match, then in step S276, DSM 118A examines the DeviceId and compares to a Supported device list. If there is a device match in step S278, then the LUN is added to the DSM path in Step S286. A multi-path object is created in step S288, and in step S290, the process determines if phase 2 is complete.

If yes, then the boot process is over in step S292. If Phase 2 is not over, then the process reverts back to step S258A in step S294.

If the DeviceId does not match in step S278, then in step S280 a disk object is created that is made available in step S282 to application 104. In step S284, the process reverts back to step S258A.

FIG. 3 shows a flow diagram, according to one aspect of the present invention and is applicable to both Phase 1 (from step S214) and Phase 2 (step S286). The adaptive process of FIG.

3 eliminates the create/remove/create steps described above with respect to FIGS. 2A-2B and hence is more efficient.

In step S300, the process determines if a LUN key exists. This is a unique registry key derived from a HBA World wide Port Number, a SCSI address and a target inquiry. The term "target inquiry" includes a unique identifier (DeviceID) from a target vendor.

If no LUN key exists, then the process moves towards completing Phase 1. In step S304, a LUN key is created in step S304. In step S306, DSM layer 118A adds the LUN key to the LUN list 118B.

In step S308, a device object is created and made available in step S310. Thereafter, the process moves back to step S204 to complete Phase 1.

If a LUN key exists in step S300, then the process moves to Phase 2. In step S302A, the LUN is added to DSM layer 118A path. A multi-path object is created in step S302B.

In step S302C, the process determines if Phase 2 is complete. If yes, then the boot process is over in step S302E. If not, then in step S302D, the process reverts back to step S258A (FIG. 2B).

In one aspect of the present invention, the conventional create/remove/create process steps are avoided. The boot process is more efficient and avoids delays. Also, the storage controller configuration is not changed by unnecessary failovers commanded by host 100.

Although the present invention has been described with reference to specific embodiments, these embodiments are illustrative only and not limiting. Many other applications and embodiments of the present invention will be apparent in light of this disclosure and the following claims.

What is claimed is:

1. A method for managing storage devices, comprising:
   determining during a boot process if a logical unit number ("LUN") key exists; and
   proceeding to a phase 1 of the boot process if the LUN key does not exist or proceeding to a phase 2 of the boot process if the LUN key does exist.

2. The method of claim 1, wherein if the LUN key does not exist, then a LUN key is created for the phase 1 of the boot process.

3. The method of claim 2, wherein the LUN key is added to a LUN list managed by a device specific module.

4. The method of claim 3, wherein a disk object is created in the phase 1 of the boot process.

5. The method of claim 1, wherein if the LUN key exists, then in the phase 2 of the boot process, the LUN is added to a device specific module path to a storage device.

6. The method of claim 5, wherein a multi-path object is created in the phase 2 of the boot process.

7. The method of claim 6, wherein if the boot process determines that the phase 1 is complete, then the multi-path object is initialized.

8. The method of claim 7, wherein the boot process moves to the phase 2 when initialization is complete.

9. The method of clam 7, wherein a multi-path input output layer requests load balancing if initialization is not complete.

10. The method of claim 8, wherein the boot process proceeds to the phase 2 if an active path that allows access to the LUN key is found.

11. The method of claim 10, wherein a device specific module path commands a fail over to an alternate storage device if the active path is not found.

12. The method of claim 11, wherein the active path is moved to the alternate storage device by the device specific module path.

13. The method of claim 12, wherein the boot process determines if an alternate LUN path is ready.

14. The method of claim 13, wherein if the alternate LUN path is ready, a disk object is made available.

15. The method of claim 13, wherein if the alternate LUN path is not ready, the boot process waits for a programmable period of time.

16. The method of claim 15, wherein the boot process determines if additional active paths are available if a timeout occurs.

17. The method of claim 16, wherein passive paths are used if the additional active paths are not ready and the boot process proceeds to the phase 2.

18. The method of claim 17, wherein the boot process determines if the disk object is registered.

19. The method of claim 18, wherein the boot process makes the disk object available if the disk object is registered.

20. A networking system, comprising:
   a computing system with a processor for executing computer executable code; and
   a host bus adapter coupled to the computing system to interface with at least a storage device; wherein the processor executes code to determine during a boot process if a logical unit number ("LUN") key exists; and proceeds to a phase 1 of the boot process if the LUN key does not exist or proceeds to a phase 2 of the boot process if the LUN key does exist.

21. The system of claim 20, wherein if the LUN key does not exist, then a LUN key is created for the phase 1 of the boot process and added to a LUN list managed by a device specific module.

22. The system of claim 20, wherein if the LUN key exists, then in the phase 2 of the boot process, the LUN is added to a device specific module path to a storage device.

23. The system of claim 22, wherein a multi-path object is created in the phase 2 of the boot process.

24. The system of claim 23, wherein if the boot process determines that the phase 1 is complete, then the multi-path object is initialized.

25. The system of claim 20, wherein the processor executes a multi-path input output layer with a multi-path disk driver, coupled to a device specific module to determine if a particular device is supported by the networking system; and the multi-path disk driver claims ownership of the particular device upon identification and association by the device specific module.

26. The system of claim 25, further comprising a PNP manager coupled to the multi-path input output layer.

* * * * *